(12) United States Patent
Turk

(10) Patent No.: US 9,506,785 B2
(45) Date of Patent: Nov. 29, 2016

(54) REMOTE FLOW RATE MEASURING

(71) Applicant: Rain Bird Corporation, Azusa, CA (US)

(72) Inventor: Michael F. Turk, Porter Ranch, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 14/213,328

(22) Filed: Mar. 14, 2014

(65) Prior Publication Data

US 2014/0260673 A1  Sep. 18, 2014

Related U.S. Application Data

(60) Provisional application No. 61/799,918, filed on Mar. 15, 2013.

(51) Int. Cl.
  *G01F 7/00*   (2006.01)
  *G01F 15/00*  (2006.01)
  *G01F 1/06*   (2006.01)

(52) U.S. Cl.
  CPC ..................................... *G01F 1/065* (2013.01)

(58) Field of Classification Search
  None
  See application file for complete search history.

(56) References Cited

U.S. PATENT DOCUMENTS

| | | | |
|---|---|---|---|
| 483,552 A | | 10/1892 | Goodell |
| 3,085,423 A | | 4/1963 | Champion |
| 3,357,255 A | | 12/1967 | Reynolds |
| 3,530,705 A | | 9/1970 | Lathrop |
| 3,711,689 A | | 1/1973 | Park |
| 3,721,116 A | | 3/1973 | Brachet |
| 3,723,987 A | | 3/1973 | Barone, Jr. et al. |
| 3,801,239 A | | 4/1974 | Larson |
| 3,807,220 A | | 4/1974 | Ottenstein et al. |
| 3,857,277 A | | 12/1974 | Moore |
| 3,882,723 A | | 5/1975 | Wickham |
| 3,948,083 A | | 4/1976 | Wickham |
| 3,955,415 A | | 5/1976 | Sharon |
| 3,975,943 A | | 8/1976 | Brachet |
| 3,987,662 A | | 10/1976 | Hara et al. |
| 4,305,281 A | * | 12/1981 | Lee ........................ G01F 25/003 73/861.84 |
| 4,361,030 A | | 11/1982 | Heide |
| 4,501,158 A | | 2/1985 | Pelikan |
| 4,530,463 A | | 7/1985 | Hiniker |
| 4,548,076 A | * | 10/1985 | Haake ....................... G01F 5/00 73/861.76 |
| 4,581,946 A | * | 4/1986 | Kanayama ............... G01F 1/125 73/861.83 |
| 4,590,805 A | * | 5/1986 | Baird ........................ G01F 1/06 73/861.77 |
| 4,637,547 A | | 1/1987 | Hiniker |
| 4,643,213 A | | 2/1987 | Mirel |
| 4,729,106 A | | 3/1988 | Rush |
| 4,730,637 A | | 3/1988 | White |
| 4,797,666 A | | 1/1989 | Baxter |
| 4,870,859 A | | 10/1989 | Twerdochlib |
| 4,888,706 A | | 12/1989 | Rush |
| 4,936,151 A | * | 6/1990 | Tokio ...................... G01F 1/065 73/861.77 |
| 4,962,666 A | | 10/1990 | Adney |
| 4,987,914 A | | 1/1991 | Adney |

(Continued)

*Primary Examiner* — Harshad R Patel
(74) *Attorney, Agent, or Firm* — Fitch, Even, Tabin & Flannery, LLP

(57) ABSTRACT

The methods and systems described herein can be used for remote measuring of flow rate from a multitude of different flow meters without requiring each flow meter to be capable of onboard processing and displaying of flow rate information. A single electronic device can be used to remotely measure the flow rate of a multitude of different flow meters.

18 Claims, 4 Drawing Sheets

(56) References Cited

U.S. PATENT DOCUMENTS

| | | |
|---|---|---|
| 5,004,014 A | 4/1991 | Bender |
| 5,007,453 A | 4/1991 | Berkowitz |
| 5,014,543 A | 5/1991 | Franklin |
| 5,038,268 A | 8/1991 | Krause |
| 5,040,409 A | 8/1991 | Kiewit |
| 5,046,353 A | 9/1991 | Thompson |
| 5,048,755 A | 9/1991 | Dodds |
| 5,052,212 A | 10/1991 | Cohrs |
| 5,056,554 A | 10/1991 | White |
| 5,062,442 A | 11/1991 | Stenstrom |
| 5,072,621 A | 12/1991 | Hasselmann |
| 5,086,806 A | 2/1992 | Engler |
| 5,097,861 A | 3/1992 | Hopkins |
| 5,099,698 A * | 3/1992 | Kath .................. G01F 1/24 73/861.56 |
| 5,138,888 A * | 8/1992 | Walmer, Sr. ............. G01F 1/12 73/861.83 |
| 5,158,207 A | 10/1992 | Van Daele |
| 5,228,469 A | 7/1993 | Otten |
| 5,251,653 A | 10/1993 | Tucker |
| 5,272,646 A | 12/1993 | Farmer |
| 5,287,884 A | 2/1994 | Cohen |
| 5,315,862 A | 5/1994 | Hasselmann |
| 5,419,203 A | 5/1995 | Carmichael |
| 5,438,862 A | 8/1995 | Keating |
| 5,494,070 A | 2/1996 | Hilton |
| 5,586,050 A | 12/1996 | Makel |
| 5,590,686 A | 1/1997 | Prendergast |
| 5,612,890 A | 3/1997 | Strasser |
| 5,616,830 A | 4/1997 | Wodeslavsky |
| 5,636,653 A | 6/1997 | Titus |
| 5,637,789 A | 6/1997 | Lawson |
| 5,650,564 A | 7/1997 | Wodeslavsky |
| 5,655,568 A | 8/1997 | Bhargava |
| 5,677,501 A * | 10/1997 | Kawaguchi ............. G01D 7/08 73/866.3 |
| 5,698,793 A | 12/1997 | Carmichael |
| 5,708,195 A | 1/1998 | Kurisu |
| 5,717,137 A | 2/1998 | Singleterry |
| 5,739,420 A | 4/1998 | Peterson |
| 5,746,413 A | 5/1998 | Goloff |
| 5,769,108 A | 6/1998 | Proudman |
| 5,771,920 A | 6/1998 | Jewett |
| 5,814,735 A | 9/1998 | Kurisaki |
| 5,816,246 A * | 10/1998 | Mirza ................... A61B 5/09 73/861.77 |
| 5,820,715 A | 10/1998 | Singleterry |
| 5,838,258 A | 11/1998 | Saar |
| 5,884,649 A | 3/1999 | Proudman |
| 5,890,515 A | 4/1999 | Spiess |
| 5,902,927 A | 5/1999 | Titus |
| 5,911,238 A | 6/1999 | Bump |
| 5,913,236 A | 6/1999 | Wodeslavsky |
| 5,918,268 A | 6/1999 | Lukas |
| 5,918,271 A | 6/1999 | McGuigan |
| 5,944,048 A | 8/1999 | Bump |
| 5,950,667 A | 9/1999 | Nicewonger |
| 5,970,801 A | 10/1999 | Ciobanu |
| 5,971,011 A | 10/1999 | Price |
| 5,975,126 A | 11/1999 | Bump |
| 5,992,218 A | 11/1999 | Tryba |
| 6,003,549 A | 12/1999 | Delcroix |
| 6,019,003 A * | 2/2000 | Wieder .................. G01F 1/10 73/861.77 |
| 6,026,838 A | 2/2000 | Nicewonger |
| 6,032,540 A | 3/2000 | Hawkins |
| 6,041,801 A | 3/2000 | Gray |
| 6,041,807 A | 3/2000 | Honaga |
| 6,065,941 A | 5/2000 | Gray |
| 6,076,542 A | 6/2000 | Titus |
| 6,079,263 A | 6/2000 | Beddies |
| 6,079,279 A | 6/2000 | Bussow |
| 6,112,579 A | 9/2000 | Tryba |
| 6,119,528 A | 9/2000 | Genack |
| 6,128,946 A | 10/2000 | Leon |
| 6,134,949 A | 10/2000 | Leon |
| 6,161,100 A | 12/2000 | Saar |
| 6,170,508 B1 | 1/2001 | Faust |
| 6,202,679 B1 | 3/2001 | Titus |
| 6,213,986 B1 | 4/2001 | Darling |
| 6,216,727 B1 | 4/2001 | Genova |
| 6,237,618 B1 | 5/2001 | Kushner |
| 6,240,950 B1 | 6/2001 | Harris |
| 6,314,795 B1 | 11/2001 | Ingham |
| 6,317,051 B1 | 11/2001 | Cohen |
| 6,323,774 B1 | 11/2001 | Mitchell |
| 6,328,053 B1 | 12/2001 | Slaydon |
| 6,343,614 B1 | 2/2002 | Gray |
| 6,377,190 B1 | 4/2002 | Saar |
| 6,402,048 B1 | 6/2002 | Collins |
| 6,460,565 B1 | 10/2002 | Titus |
| 6,485,263 B1 | 11/2002 | Bryant |
| 6,489,895 B1 | 12/2002 | Apelman |
| 6,491,062 B1 | 12/2002 | Croft |
| 6,502,451 B1 | 1/2003 | Fourie |
| 6,513,542 B1 | 2/2003 | Hsieh |
| 6,520,003 B1 | 2/2003 | Fox |
| 6,520,747 B2 | 2/2003 | Gray |
| 6,530,262 B1 | 3/2003 | Esser |
| 6,535,827 B1 | 3/2003 | Lestina |
| 6,539,814 B1 | 4/2003 | Popp |
| 6,568,416 B2 | 5/2003 | Tucker |
| 6,591,694 B2 | 7/2003 | Tsai |
| 6,626,042 B2 | 9/2003 | Havlena |
| 6,654,697 B1 | 11/2003 | Eryurek |
| 6,688,535 B2 | 2/2004 | Collins |
| 6,691,924 B1 | 2/2004 | Vestergaard |
| 6,694,824 B2 | 2/2004 | Shinmura |
| 6,766,835 B1 | 7/2004 | Fima |
| 6,782,311 B2 | 8/2004 | Barlow |
| 6,792,799 B2 | 9/2004 | Ford |
| 6,796,173 B1 * | 9/2004 | Lajoie ................... G01F 3/10 73/861.77 |
| 6,819,292 B2 | 11/2004 | Winter |
| 6,830,064 B2 | 12/2004 | Ji |
| 6,832,625 B2 | 12/2004 | Ford |
| 6,842,706 B1 | 1/2005 | Baraty |
| 6,857,308 B2 | 2/2005 | Johnson |
| 6,892,113 B1 | 5/2005 | Addink |
| 6,895,995 B2 | 5/2005 | Kirkman |
| 6,907,383 B2 | 6/2005 | Eryurek |
| 6,920,778 B2 | 7/2005 | Koike |
| 6,931,305 B2 | 8/2005 | Sherwood |
| 6,939,470 B2 | 9/2005 | Baarman |
| 6,954,178 B2 | 10/2005 | Winter |
| 6,957,157 B2 | 10/2005 | Lander |
| 6,963,808 B1 | 11/2005 | Addink |
| 6,968,856 B1 | 11/2005 | Goza |
| 6,970,808 B2 | 11/2005 | Abhulimen |
| 6,971,625 B2 | 12/2005 | Szymaszek |
| 6,973,373 B2 | 12/2005 | Gray |
| 6,973,827 B2 | 12/2005 | Koike |
| 6,988,419 B2 | 1/2006 | Müller |
| 7,028,533 B2 | 4/2006 | Koike |
| 7,032,610 B2 | 4/2006 | Matsuo |
| 7,050,887 B2 | 5/2006 | Alvarez |
| 7,097,113 B2 | 8/2006 | Ivans |
| 7,107,128 B2 | 9/2006 | Laverdiere |
| 7,114,516 B2 | 10/2006 | Ito |
| 7,126,551 B2 | 10/2006 | Winter |
| 7,150,201 B2 | 12/2006 | Tison |
| 7,174,771 B2 | 2/2007 | Cooper |
| 7,174,772 B2 | 2/2007 | Sacca |
| 7,191,955 B2 | 3/2007 | Ivans |
| 7,193,233 B2 | 3/2007 | Smith |
| 7,201,180 B2 | 4/2007 | Ephrat |
| 7,228,726 B2 | 6/2007 | Kates |
| 7,233,252 B1 | 6/2007 | Hardin |
| 7,254,518 B2 | 8/2007 | Eryurek |
| 7,287,434 B2 | 10/2007 | Tison |
| 7,308,824 B2 | 12/2007 | Trescott |
| 7,317,971 B2 | 1/2008 | Laverdiere |
| 7,330,796 B2 | 2/2008 | Addink |
| 7,334,455 B2 | 2/2008 | Yanagi |

(56) References Cited

U.S. PATENT DOCUMENTS

| | | | |
|---|---|---|---|
| 7,343,795 B2 | 3/2008 | Winter | |
| 7,346,434 B2 | 3/2008 | Goza | |
| 7,349,763 B2 | 3/2008 | Ivans | |
| 7,349,813 B2* | 3/2008 | Gutierrez | G01F 15/024 702/45 |
| 7,360,413 B2 | 4/2008 | Jeffries | |
| 7,366,625 B1 | 4/2008 | Augenstein | |
| 7,377,184 B1 | 5/2008 | Schlachter | |
| 7,383,721 B2 | 6/2008 | Parsons | |
| 7,392,817 B2 | 7/2008 | Burlage | |
| 7,395,708 B2 | 7/2008 | Kirchner | |
| 7,412,876 B2 | 8/2008 | Kates | |
| 7,444,886 B2 | 11/2008 | Furkert | |
| 7,451,777 B2 | 11/2008 | Burlage | |
| 7,458,521 B2 | 12/2008 | Ivans | |
| 7,480,544 B2 | 1/2009 | Wang | |
| 7,491,320 B2* | 2/2009 | Gross | B01D 35/143 73/861.79 |
| 7,494,070 B2 | 2/2009 | Collins | |
| 7,536,900 B2 | 5/2009 | Nakamura | |
| 7,546,181 B2 | 6/2009 | Vidovich | |
| 7,549,348 B2 | 6/2009 | Brown | |
| 7,549,439 B2 | 6/2009 | Kimura | |
| 7,574,896 B1 | 8/2009 | Cooper | |
| 7,596,429 B2 | 9/2009 | Cardinal | |
| 7,596,458 B2 | 9/2009 | Lander | |
| 7,617,992 B2 | 11/2009 | Ivans | |
| 7,637,152 B2 | 12/2009 | Ushigusa | |
| 7,668,670 B2 | 2/2010 | Lander | |
| 7,669,461 B2 | 3/2010 | Kates | |
| 7,669,594 B2 | 3/2010 | Downie | |
| 7,685,866 B2 | 3/2010 | Bierbaum | |
| 7,693,606 B2 | 4/2010 | Ahmad | |
| 7,708,206 B2 | 5/2010 | Ivans | |
| 7,711,454 B2 | 5/2010 | Addink | |
| 7,711,651 B2 | 5/2010 | Baraty | |
| 7,723,860 B2 | 5/2010 | Nagler | |
| 7,729,993 B2 | 6/2010 | Baraty | |
| 7,742,862 B2 | 6/2010 | Anderson | |
| 7,774,282 B2 | 8/2010 | Baraty | |
| 7,779,852 B2 | 8/2010 | Burlage | |
| 7,822,511 B2 | 10/2010 | Ivans | |
| 7,841,229 B2 | 11/2010 | Ridgway | |
| 7,856,864 B2 | 12/2010 | McEwan | |
| 7,861,740 B2 | 1/2011 | Phallen | |
| 7,891,246 B2 | 2/2011 | Lander | |
| 7,899,580 B2 | 3/2011 | Cardinal | |
| 7,920,983 B1 | 4/2011 | Peleg | |
| 7,930,069 B2 | 4/2011 | Savelle | |
| 7,930,085 B2 | 4/2011 | Anderson | |
| 7,940,189 B2 | 5/2011 | Brown | |
| 7,944,363 B2 | 5/2011 | Kim | |
| 7,949,495 B2 | 5/2011 | Wiklund | |
| 7,966,099 B2 | 6/2011 | Fima | |
| 7,969,318 B2 | 6/2011 | White | |
| 7,970,494 B2 | 6/2011 | Fima | |
| 7,994,927 B2 | 8/2011 | Atassi | |
| 8,020,585 B2 | 9/2011 | Shock | |
| 8,072,340 B2 | 12/2011 | Yukawa | |
| 8,082,066 B2 | 12/2011 | Laverdiere | |
| 8,109,131 B2 | 2/2012 | Winter | |
| 8,130,107 B2 | 3/2012 | Meyer | |
| 8,145,359 B2 | 3/2012 | Addink | |
| 8,172,200 B2 | 5/2012 | Kroemmer | |
| 8,174,398 B2 | 5/2012 | Wien | |
| 8,175,752 B2 | 5/2012 | Deivasigamani | |
| 8,193,942 B2 | 6/2012 | White | |
| 8,205,508 B2 | 6/2012 | Healey | |
| 8,205,632 B2 | 6/2012 | Fishwick | |
| 8,256,304 B2 | 9/2012 | Therrian | |
| 8,265,887 B2 | 9/2012 | Itou | |
| 8,271,143 B2 | 9/2012 | Deivasigamani | |
| 8,301,309 B1 | 10/2012 | Woytoxitz | |
| 8,308,857 B2 | 11/2012 | Couillard | |
| 8,316,695 B2 | 11/2012 | Jarvie | |
| 8,332,130 B2 | 12/2012 | Stretch | |
| 8,336,544 B2 | 12/2012 | Downie | |
| 8,353,221 B2 | 1/2013 | Schmid | |
| 8,365,753 B2 | 2/2013 | Dana | |
| 8,380,448 B2 | 2/2013 | Franklin | |
| 8,439,068 B2 | 5/2013 | Croibier | |
| 8,441,361 B2 | 5/2013 | McAlister | |
| 8,443,822 B2 | 5/2013 | Ivans | |
| 8,443,823 B1 | 5/2013 | Prager | |
| 8,457,908 B2 | 6/2013 | Patel | |
| 8,464,582 B2 | 6/2013 | Roux | |
| 8,498,523 B2 | 7/2013 | Deivasigamani | |
| 8,499,616 B2 | 8/2013 | Stoner | |
| 8,504,318 B2 | 8/2013 | Mendelson | |
| 8,517,051 B2 | 8/2013 | Fazekas | |
| 8,531,303 B2 | 9/2013 | Pham | |
| 8,548,632 B1 | 10/2013 | Porter | |
| 8,561,636 B2 | 10/2013 | Eithun | |
| 8,590,395 B2 | 11/2013 | Ge | |
| 8,600,569 B2 | 12/2013 | Woytowitz | |
| 8,606,413 B2 | 12/2013 | Picton | |
| 8,607,645 B2 | 12/2013 | Laubach | |
| 8,616,234 B2 | 12/2013 | Ringer | |
| 8,618,941 B2 | 12/2013 | Javey | |
| 8,649,907 B2 | 2/2014 | Ersavas | |
| 8,666,683 B2 | 3/2014 | Rogers | |
| 8,667,978 B2 | 3/2014 | Ford | |
| 8,668,830 B2 | 3/2014 | Soecknick | |
| 8,717,183 B2 | 5/2014 | Pal | |
| 8,719,187 B2 | 5/2014 | Milanes | |
| 8,720,481 B2 | 5/2014 | Guy | |
| 8,727,604 B2 | 5/2014 | Compton | |
| 8,749,393 B1 | 6/2014 | Tollefson | |
| 8,756,022 B2 | 6/2014 | Franklin | |
| 8,793,024 B1 | 7/2014 | Woytowitz | |
| 8,800,473 B1 | 8/2014 | DeVerse | |
| 8,816,866 B2 | 8/2014 | Day | |
| 8,831,024 B2 | 9/2014 | Robinson | |
| 8,833,384 B2 | 9/2014 | Burt | |
| 8,833,405 B2 | 9/2014 | Phallen | |
| 8,834,134 B2 | 9/2014 | Baker | |
| 8,844,835 B2 | 9/2014 | Ford | |
| 8,849,461 B2 | 9/2014 | Ersavas | |
| 8,850,871 B2 | 10/2014 | Schaefer | |
| 8,850,872 B2 | 10/2014 | Jarvie | |
| 8,857,466 B1 | 10/2014 | Wilson | |
| 8,905,062 B2 | 12/2014 | Menet | |
| 8,910,887 B2 | 12/2014 | Helmsderfer | |
| 8,931,330 B2 | 1/2015 | Lucente | |
| 8,948,979 B2 | 2/2015 | Malsam | |
| 8,950,249 B2 | 2/2015 | Stoner | |
| 8,965,584 B2 | 2/2015 | Deivasigamani | |
| 9,010,360 B1 | 4/2015 | Older | |
| 9,019,120 B2 | 4/2015 | Broniak | |
| 9,037,422 B2 | 5/2015 | McHugh | |
| 9,062,895 B2 | 6/2015 | Deivasigamani | |
| 9,081,389 B2 | 7/2015 | Foster | |
| 9,146,172 B2 | 9/2015 | Trescott | |
| 9,151,022 B2 | 10/2015 | Patel | |
| 9,157,540 B2 | 10/2015 | Larsen | |
| 9,207,143 B2 | 12/2015 | Franklin | |
| 9,222,490 B2 | 12/2015 | Fishwick | |
| 9,222,848 B2 | 12/2015 | Cho | |
| 9,234,679 B2 | 1/2016 | Deivasigamani | |
| 9,239,059 B2 | 1/2016 | Locke | |
| 9,241,451 B2 | 1/2016 | Ersavas | |
| 9,244,449 B2 | 1/2016 | Tennyson | |
| 9,250,105 B2 | 2/2016 | Patel | |
| 9,258,952 B2 | 2/2016 | Walker | |
| 9,261,218 B2 | 2/2016 | Cheatham | |
| 9,265,204 B2 | 2/2016 | Younis | |
| 9,291,520 B2 | 3/2016 | Fleury | |
| 9,297,150 B2 | 3/2016 | Klicpera | |
| 9,297,467 B1 | 3/2016 | Goseco | |
| 9,298,191 B2 | 3/2016 | Meyer | |
| 2001/0049563 A1 | 12/2001 | Addink | |
| 2002/0002425 A1 | 1/2002 | Dossey | |
| 2002/0010516 A1 | 1/2002 | Addink | |
| 2003/0047008 A1* | 3/2003 | Gopalakrishnan | G01F 1/34 |

(56) References Cited

U.S. PATENT DOCUMENTS

| | | | |
|---|---|---|---|
| 2003/0109964 A1 | 6/2003 | Addink | 73/861.79 |
| 2003/0111178 A1 | 6/2003 | Morita | |
| 2003/0179102 A1 | 9/2003 | Barnes | |
| 2003/0182022 A1 | 9/2003 | Addink | |
| 2003/0183018 A1 | 10/2003 | Addink | |
| 2003/0197617 A1 | 10/2003 | Berger | |
| 2004/0015270 A1 | 1/2004 | Addink | |
| 2004/0128034 A1 | 7/2004 | Lenker | |
| 2004/0206405 A1 | 10/2004 | Smith | |
| 2004/0217041 A1 | 11/2004 | Baarman | |
| 2004/0217189 A1 | 11/2004 | Regli | |
| 2005/0028609 A1 | 2/2005 | Langemann | |
| 2005/0039546 A1* | 2/2005 | Payne | G01F 1/115 73/861.79 |
| 2005/0126635 A1 | 6/2005 | Addink | |
| 2005/0166666 A1 | 8/2005 | Tsukagoshi | |
| 2005/0199842 A1 | 9/2005 | Parsons | |
| 2005/0235306 A1 | 10/2005 | Fima | |
| 2006/0027267 A1 | 2/2006 | Fritze | |
| 2006/0030990 A1 | 2/2006 | Anderson | |
| 2006/0137419 A1 | 6/2006 | Mizohata | |
| 2006/0157580 A1 | 7/2006 | Regli | |
| 2006/0168611 A1 | 7/2006 | Fima | |
| 2006/0174707 A1 | 8/2006 | Zhang | |
| 2006/0196212 A1 | 9/2006 | Jenkins | |
| 2006/0248934 A9 | 11/2006 | Mizohata | |
| 2006/0260691 A1 | 11/2006 | Davidoff | |
| 2006/0272704 A1 | 12/2006 | Fima | |
| 2006/0272830 A1 | 12/2006 | Fima | |
| 2007/0068225 A1 | 3/2007 | Brown | |
| 2007/0095400 A1 | 5/2007 | Bergquist | |
| 2007/0130317 A1 | 6/2007 | Lander | |
| 2007/0193334 A1* | 8/2007 | Hays | G01F 1/8436 73/866.1 |
| 2007/0221223 A1 | 9/2007 | McDermott | |
| 2007/0284550 A1 | 12/2007 | Smith | |
| 2008/0142115 A1 | 6/2008 | Vogt | |
| 2008/0143540 A1 | 6/2008 | Savla | |
| 2008/0184775 A1 | 8/2008 | Yamagishi | |
| 2008/0184781 A1 | 8/2008 | Mulligan | |
| 2008/0185049 A1 | 8/2008 | Mulligan | |
| 2008/0185050 A1 | 8/2008 | Mulligan | |
| 2008/0188991 A1 | 8/2008 | Mulligan | |
| 2008/0266125 A1 | 10/2008 | Windisch | |
| 2008/0276722 A1* | 11/2008 | Wiedmann | G01F 1/40 73/861 |
| 2008/0284175 A1 | 11/2008 | Nagler | |
| 2008/0295895 A1 | 12/2008 | Vincent | |
| 2009/0001193 A1 | 1/2009 | Parsons | |
| 2009/0007968 A1 | 1/2009 | Knecht | |
| 2009/0035121 A1* | 2/2009 | Watson | F01C 1/126 73/861.87 |
| 2009/0123340 A1 | 5/2009 | Knudsen | |
| 2009/0179165 A1 | 7/2009 | Parsons | |
| 2009/0194719 A1 | 8/2009 | Mulligan | |
| 2009/0235992 A1 | 9/2009 | Armstrong | |
| 2009/0321535 A1 | 12/2009 | Davis | |
| 2010/0023170 A1 | 1/2010 | Sherwood | |
| 2010/0023172 A1 | 1/2010 | Malinowski | |
| 2010/0038440 A1 | 2/2010 | Ersavas | |
| 2010/0132803 A1 | 6/2010 | Fima | |
| 2010/0145635 A1 | 6/2010 | Pauncz | |
| 2010/0204839 A1 | 8/2010 | Behm | |
| 2010/0212748 A1 | 8/2010 | Davidoff | |
| 2010/0212752 A1 | 8/2010 | Fima | |
| 2010/0258204 A1 | 10/2010 | Cipolla | |
| 2010/0294021 A1 | 11/2010 | Makino | |
| 2010/0312438 A1 | 12/2010 | Cooley | |
| 2010/0326372 A1 | 12/2010 | Kim | |
| 2011/0035063 A1 | 2/2011 | Palayur | |
| 2011/0050395 A1 | 3/2011 | Ervin | |
| 2011/0054712 A1 | 3/2011 | Baraty | |
| 2011/0073189 A1 | 3/2011 | Elbert | |
| 2011/0155269 A1 | 6/2011 | Martin | |
| 2011/0166714 A1 | 7/2011 | Stachnik | |
| 2011/0174706 A1 | 7/2011 | Russell | |
| 2011/0190947 A1 | 8/2011 | Savelle | |
| 2011/0191267 A1 | 8/2011 | Savic | |
| 2011/0232770 A1 | 9/2011 | Baggett | |
| 2011/0302995 A1 | 12/2011 | Lebeau | |
| 2011/0309274 A1 | 12/2011 | Parsons | |
| 2012/0024080 A1* | 2/2012 | Carbone, II | G01F 3/10 73/861.04 |
| 2012/0036091 A1 | 2/2012 | Cook | |
| 2012/0056711 A1 | 3/2012 | Hanrahan | |
| 2012/0084023 A1 | 4/2012 | Mavridoglou | |
| 2012/0160034 A1* | 6/2012 | Bardon | G01F 1/12 73/861.79 |
| 2012/0191260 A1 | 7/2012 | Addink | |
| 2012/0191380 A1 | 7/2012 | Winter | |
| 2012/0223153 A1 | 9/2012 | Helmsderfer | |
| 2012/0298220 A1 | 11/2012 | Hidaka | |
| 2012/0324985 A1 | 12/2012 | Gu | |
| 2013/0037624 A1 | 2/2013 | Helmsderfer | |
| 2013/0085690 A1 | 4/2013 | Fei | |
| 2013/0174649 A1 | 7/2013 | Hains | |
| 2013/0248023 A1 | 9/2013 | Estrada | |
| 2013/0255786 A1 | 10/2013 | Nakai | |
| 2013/0291974 A1 | 11/2013 | Bourgeois | |
| 2013/0310992 A1 | 11/2013 | Larsen | |
| 2013/0325194 A1 | 12/2013 | Brine | |
| 2013/0325371 A1 | 12/2013 | Brine | |
| 2013/0332397 A1 | 12/2013 | Scolnicov | |
| 2013/0335218 A1 | 12/2013 | Jones | |
| 2013/0341420 A1 | 12/2013 | Lister | |
| 2014/0069506 A1 | 3/2014 | Helmsderfer | |
| 2014/0077108 A1 | 3/2014 | Ringer | |
| 2014/0109644 A1* | 4/2014 | Carbone, II | G01F 25/0007 73/195 |
| 2014/0121999 A1 | 5/2014 | Bracken | |
| 2014/0129039 A1 | 5/2014 | Olive-Chahinian | |
| 2014/0196802 A1 | 7/2014 | Guy | |
| 2014/0222223 A1 | 8/2014 | Horton | |
| 2014/0230925 A1 | 8/2014 | Halimi | |
| 2014/0236868 A1 | 8/2014 | Cook | |
| 2014/0245208 A1 | 8/2014 | Javey | |
| 2014/0251478 A1 | 9/2014 | Dolezilek | |
| 2014/0257720 A1 | 9/2014 | Smirnov | |
| 2014/0261714 A1 | 9/2014 | Burt | |
| 2014/0288858 A1 | 9/2014 | Franklin | |
| 2014/0306828 A1 | 10/2014 | Trescott | |
| 2014/0316723 A1 | 10/2014 | Rogers | |
| 2014/0331745 A1 | 11/2014 | Schaefer | |
| 2014/0332088 A1 | 11/2014 | Senesh | |
| 2014/0343736 A1 | 11/2014 | Meyer | |
| 2014/0345516 A1 | 11/2014 | DeVerse | |
| 2014/0348205 A1 | 11/2014 | Shaw | |
| 2014/0366612 A1 | 12/2014 | Horne | |
| 2015/0002300 A1 | 1/2015 | Cho | |
| 2015/0007897 A1 | 1/2015 | Valentine | |
| 2015/0045970 A1 | 2/2015 | Anderson | |
| 2015/0051743 A1 | 2/2015 | Darnold | |
| 2015/0069084 A1 | 3/2015 | Phallen | |
| 2015/0102136 A1 | 4/2015 | Malsam | |
| 2015/0114490 A1 | 4/2015 | Carpenter | |
| 2015/0122364 A1 | 5/2015 | Cheatham | |
| 2015/0152861 A1 | 6/2015 | Stoner | |
| 2015/0204701 A1 | 7/2015 | Klicpera | |
| 2015/0206255 A1 | 7/2015 | Groeneveld | |
| 2015/0211510 A1 | 7/2015 | Walsh | |
| 2015/0211650 A1 | 7/2015 | Older | |
| 2015/0247586 A1 | 9/2015 | Gomes | |
| 2015/0253163 A1* | 9/2015 | Ruiz Cortez | G01F 1/075 73/861.78 |
| 2015/0260310 A1 | 9/2015 | Bahalul | |
| 2015/0286222 A1 | 10/2015 | Goldstein | |
| 2015/0308084 A1 | 10/2015 | Thompson | |
| 2015/0308089 A1 | 10/2015 | Thompson | |
| 2015/0316936 A1 | 11/2015 | McCarrick | |
| 2015/0323097 A1 | 11/2015 | Stoltz | |
| 2015/0323412 A1 | 11/2015 | Stoltz | |
| 2015/0348395 A1 | 12/2015 | Trout | |
| 2015/0355045 A1 | 12/2015 | Solomon | |

(56) References Cited

U.S. PATENT DOCUMENTS

| | | |
|---|---|---|
| 2015/0367357 A1 | 12/2015 | Humpal |
| 2015/0367358 A1 | 12/2015 | Funseth |
| 2015/0375247 A1 | 12/2015 | Funseth |
| 2015/0376874 A1 | 12/2015 | Breedlove |
| 2015/0376875 A1 | 12/2015 | Patel |
| 2016/0011072 A1 | 1/2016 | Hale |
| 2016/0018283 A1 | 1/2016 | Fleury |
| 2016/0037736 A1 | 2/2016 | Rainone |
| 2016/0041565 A1 | 2/2016 | Edwards |
| 2016/0048135 A1 | 2/2016 | Hill |
| 2016/0050859 A1 | 2/2016 | Larsen |
| 2016/0055649 A1 | 2/2016 | Peret |
| 2016/0069772 A1 | 3/2016 | Gnoss |
| 2016/0073063 A1 | 3/2016 | Peret |
| 2016/0076909 A1 | 3/2016 | Klicpera |
| 2016/0076965 A1 | 3/2016 | Edris |
| 2016/0083937 A1 | 3/2016 | Cavarec |
| 2016/0090717 A1 | 3/2016 | Trescott |

\* cited by examiner

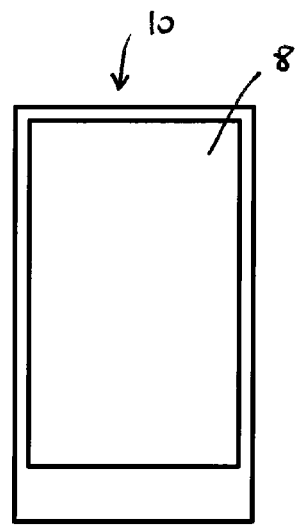
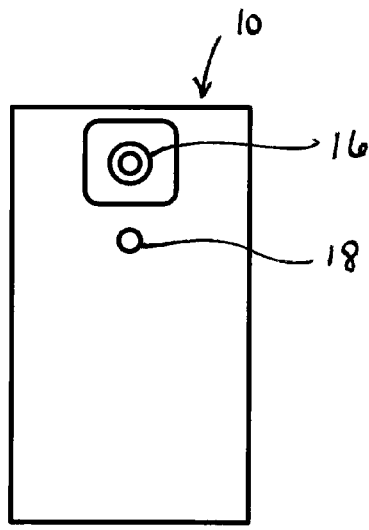
Fig. 4  Fig. 5
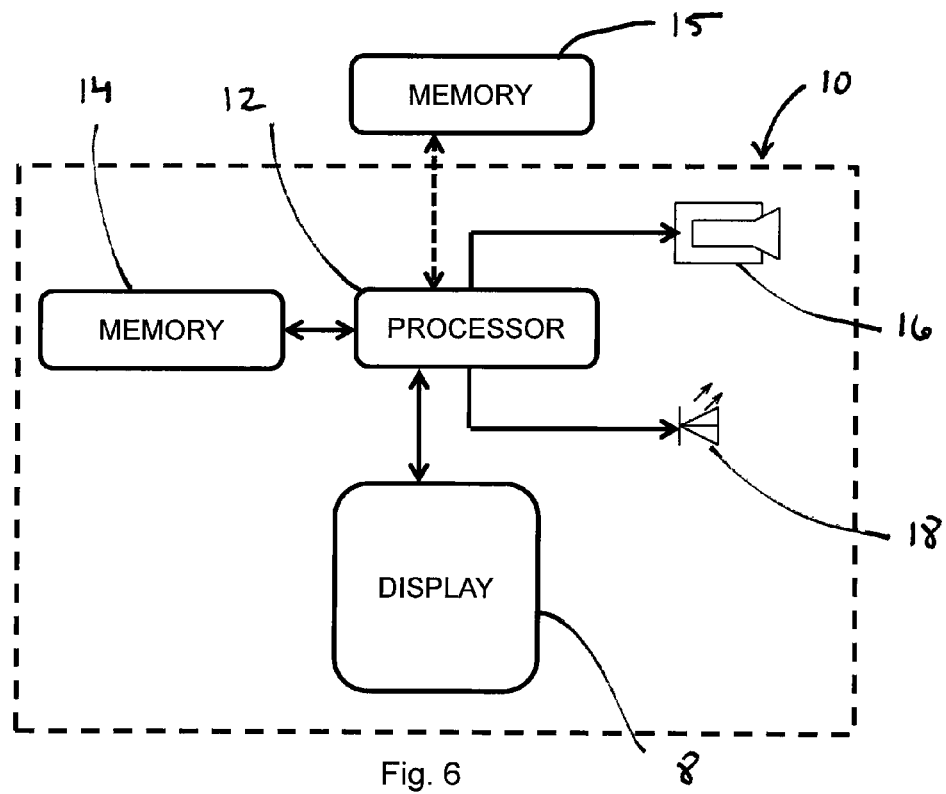
Fig. 6

REMOTE FLOW RATE MEASURING

CROSS-REFERENCE TO RELATED APPLICATION

This Application claims benefit of U.S. Provisional Application 61/799,918, filed Mar. 15, 2013, the disclosure of which is hereby incorporated by reference in its entirety.

FIELD

Systems, methods and apparatus for remote flow rate measuring are described herein, and in particular, for remote flow rate measuring suitable for measuring flow rates in irrigation systems.

BACKGROUND

It can be desirable to provide a way to measure flow rate in a fluid system. For example, in an irrigation system it can be desirable to measure flow rate at one or more locations in order to determine operating characteristic of the system, including identifying leaks, confirming operation, and the like. This desire can be of particular interest for drip irrigation systems where one or more devices may be subsurface. This desire can also be of interest for irrigation systems with subsurface water supply lines.

One solution is to use a multitude of flow meters each individually capable of providing an output of the flow rate at each flow meter. For example a flow meter can measure the flow and use an onboard processor to perform a calculation to determine and display the flow rate. However, the cost of the flow meters, including the onboard processor and display, and limit the use of such flow meters.

BRIEF DESCRIPTION OF THE DRAWINGS

FIG. 4 is a front view of an electronic device for use with the system described herein, showing a display;

FIG. 5 is a rear view of the electronic device of FIG. 5, showing a camera and light;

FIG. 6 is a schematic diagram of a processor, display, memory, camera and light of the electronic device of FIG. 4, as well as an accessible external memory;

DETAILED DESCRIPTION

The methods and systems described herein can be used for remote measuring of flow rate from a multitude of different flow meters without requiring each flow meter to be capable of onboard processing and displaying of flow rate information. A single, handheld electronic device, such as a smart phone, tablet, laptop computer or the like, can advantageously be used to remotely measure the flow rate of a multitude of different flow meters, as will be described in detail herein.

Figure 1:
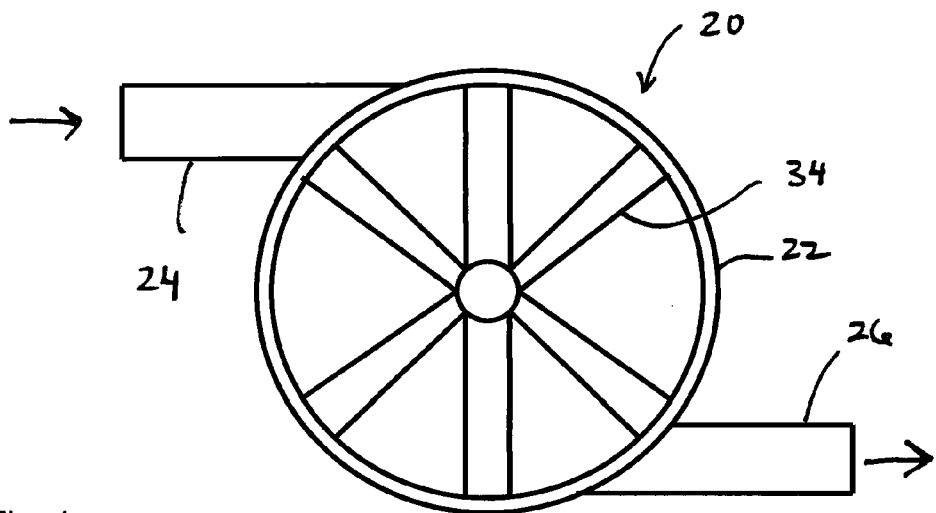
FIG. 1 is a front elevation view of a flow turbine assembly.
Figure 2:
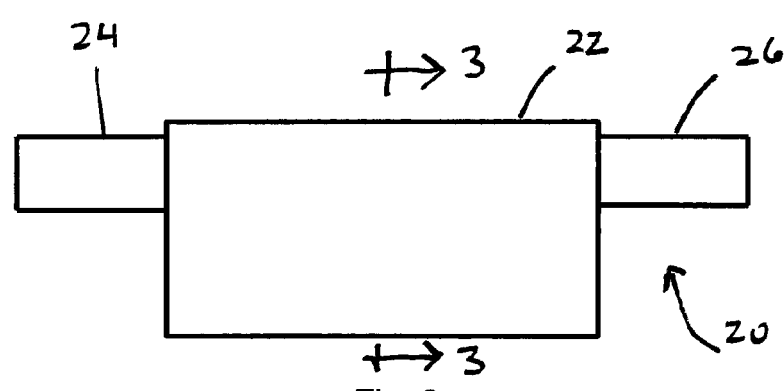
FIG. 2 is a top plan view of the flow turbine assembly of FIG. 1.
Figure 3:
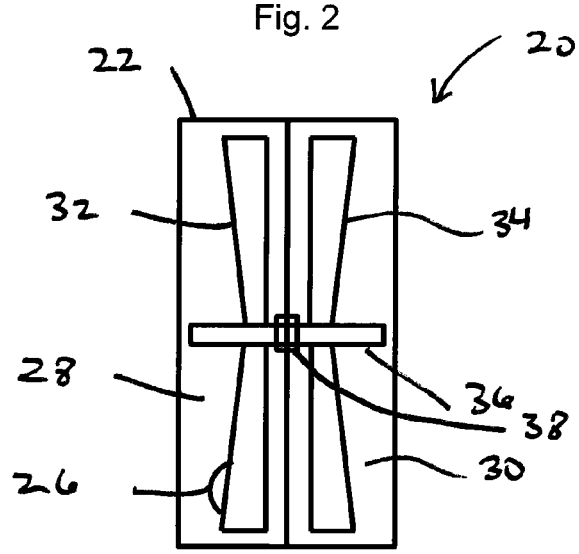
FIG. 3 is a cross section view of the flow turbine assembly of FIG. 1 taken along line 3-3 of FIG. 2.

The system can include the electronic device 10 and one or more flow meters 20. The electronic device can include a display 8, a processor 12, a memory 14, and a camera 16 and/or a light 18, as shown in FIGS. 4-6. In an exemplary form, depicted schematically in FIGS. 1-3, the flow meter 20 can include a housing 22 having an inlet 24 and an outlet 26 and flow path therebetween. The interior of the housing is divided into a portion 28 having the flow path and a portion 30 outside the flow path. The portion 28 of the housing 22 having the flow path includes a turbine 32, wheel or the like that rotates in response to the flow of fluid through the flow path. The portion 30 of the housing 22 outside the flow path includes a measured element 34 that is directly or indirectly driven for rotation by the turbine 32. The measured element 34 can be of any suitable configuration, such as a disc with markings, a fan or blades, a turbine, wheel or the like. The turbine can be magnetically coupled to the measured element, directly coupled via a shaft 36, or, in either circumstance, include a gear reducer or accelerator 38 therebetween.

In a first exemplary embodiment, measurement of the flow rate can include using the light 18 of the electronic 10 device to allow a user to visually observe a stroboscopic effect with respect to the measured element 34. More specifically, the light 18 of the electronic device 10 can be flashed at a variable frequency, such as an increasing frequency. When the user observes a stroboscopic effect of the measured element 34 at a specific frequency, the user can so indicate using the electronic device 10. The electronic device 10 can use the frequency of the light 18 flashing when the user indicated observing the stroboscopic effect to calculate the flow rate through the flow meter 20.

Figures 7A, 7B, 7C:
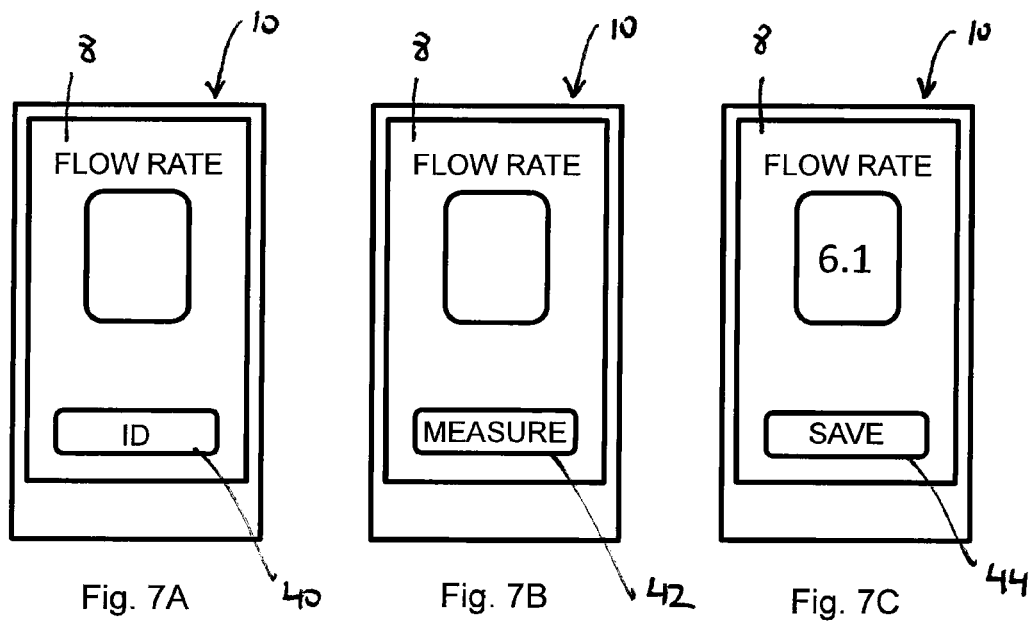
FIGS. 7A-7C are exemplary images displayed on a screen for use with software for calculating flow rate according a first method.
Figure 8:
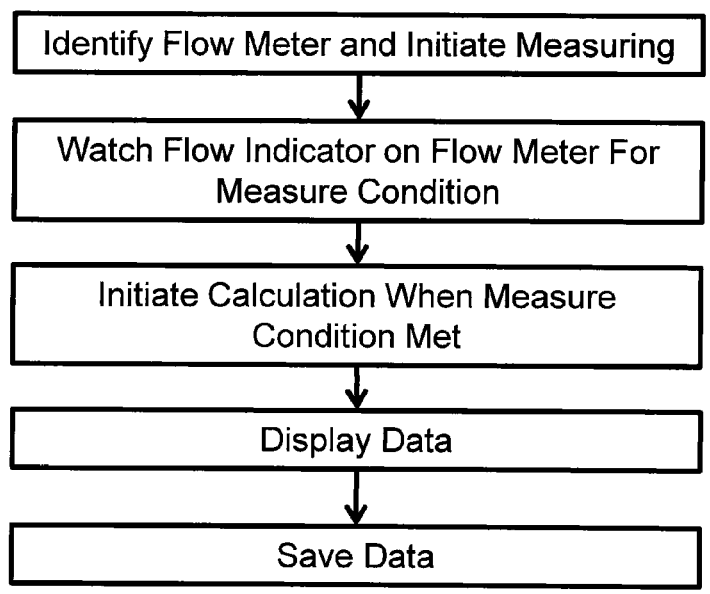
FIG. 8 is a flow diagram of exemplary steps for calculating flow rate according to the first method.

For example, and with reference to the schematic images of FIGS. 7A-7C and the flow diagram of exemplary steps of FIG. 8, the user can identify one or more properties of the flow meter 20, such as by pressing a button 40 on the display 8 of the electronic device 10, as will be described in further detail herein. The user can then initiate measuring by activating the light 18, such as by pressing a button 42 on the electronic device 10, and pointing the light 18 at the rotating measured element. When the stroboscopic effect is visually observed by the user, the user can press a button 42 on the electronic device 10 to so indicate. The electronic device 10 can then use the frequency of the light 18 flashing when the user indicated observing the stroboscopic effect to calculate the flow rate through the flow meter 20. The calculated flow rate can be displayed on the electronic device 10 and optionally either automatically saved or the user can press a button 44 on the device 10 to save the calculated flow rate, such as to a memory 14 of the electronic device 10 or an external memory accessible via a network.

In a second exemplary embodiment, measurement of the flow rate can include using the camera 16 of the electronic device 10 to record either a sequence of images or a video of the rotation of the measured element 34. The electronic device can analyze the images or video to calculate the flow rate through the flow meter 20.

Figures 9A, 9B, 9C:
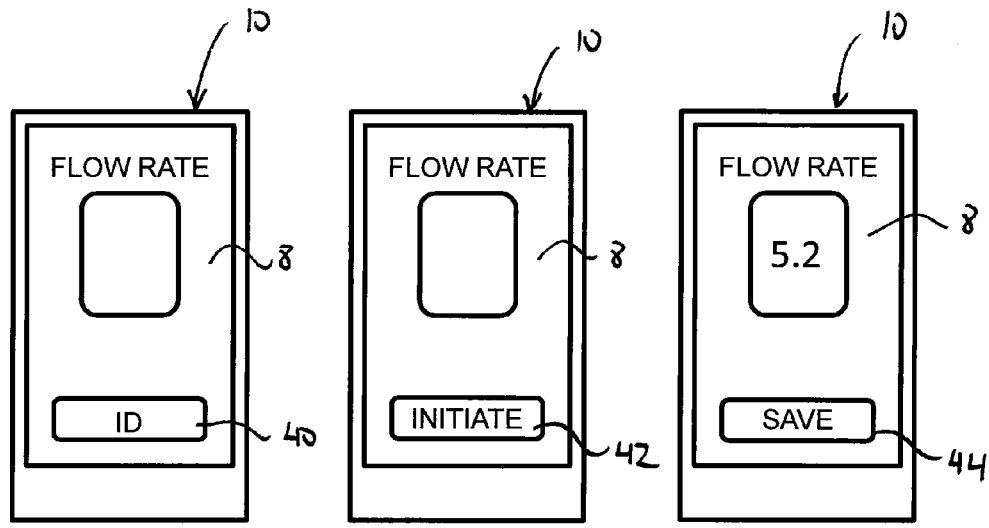
FIGS. 9A-9C are exemplary images displayed on a screen for use with software for calculating flow rate according a first method.
Figure 10:
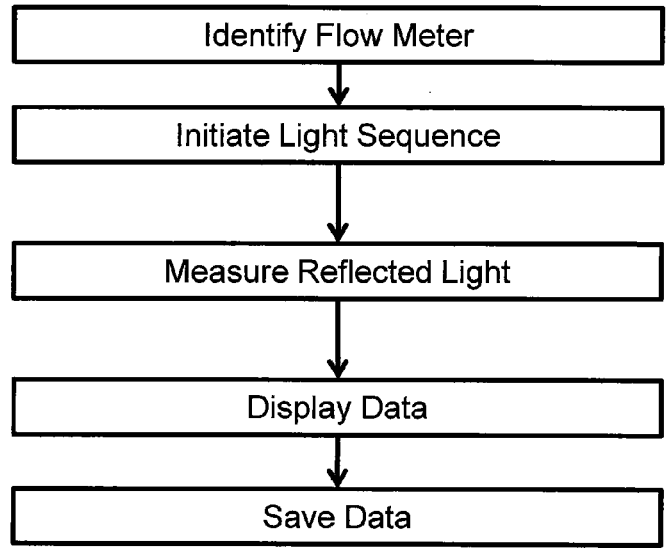
FIG. 10 is a flow diagram of exemplary steps for calculating flow rate according to the first method.

For example, and with reference to the schematic images of FIGS. 9A-9C and the flow diagram of exemplary steps of FIG. 10, the user can identify one or more properties of the flow meter 20, as will be described in further detail herein. The user can then initiate recording by the camera 16, such as by pressing a button 42 on the electronic device, and pointing the camera 16 at the rotating measured element 34. The electronic device 10 can then record the images or video and analyze the same to calculate the flow rate through the flow meter 20. The calculated flow rate can be displayed on the electronic device 10 and optionally either automatically saved or the user can press a button 44 on the device 10 to save the calculated flow rate, such as to a memory 14 of the electronic device 10 or an external memory accessible via a network.

As discussed above, one of the steps in the method of measuring the flow rate can be to identify one or more properties of the flow meter 20. The properties can include location of the flow meter 20 or measured element 34 within a flow network, type of flow meter 20 or measured element 34, specific one of a flow meter 20 or measured element 34, predicted flow rate, prior measured flow rate, and/or past measured flow rate. The identification can occur in a variety of different ways. For example, a user can use the electronic device 10 to manually select the one or more properties from a variety of selections, such as from one or more menus displayed on the electronic device 10. In another example, a user can press a button 40 on the electronic device 10 to actuate an automated selection by the electronic device 10, i.e., using the camera 16 to read a bar or other code on the flow meter 26. Combinations of automated and manual selection can also be utilized.

The electronic device 10 can be of many different forms, including those mentioned above. Exemplary devices can include a display 8, one or more buttons 40-44 (which can be physical or electronically generated on the display) a processor 12, a memory 14 accessible by the processor, and a camera 16 and/or light 18. The processor 12 can control the camera 16 and light 18, access the memory 14 for selecting and executing programs, such as for performing the first and second exemplary embodiments discussed above, access the memory 14 and/or save to the memory 14 as part of identification of one or more properties of the flow meter 20, save to the memory 14 information regarding the rotational speed of the measured element 34, access prior to subsequently stored information regarding the rotational speed of the measured element 34, calculate the flow rate, and/or control indicia on the display 8. The processor 12 can also communicate with an external, such as networked, memory 15.

The processor 12 of the electronic device can use the calculated flow rate in a variety of manners. For example, the processor 12 can cause the display to depict the calculated flow rate, compare the calculated flow rate with a predicted or previously measured flow rate and provide results of the comparison on the display 8 (e.g., indicating whether the results are within 10%, 20%, 30% or more), and/or indicate on the display 8 whether the flow rate meets a predetermined criteria for acceptability.

While the foregoing description is with respect to specific examples, those skilled in the art will appreciate that there are numerous variations of the above that fall within the scope of the concepts described herein and the appended claims.

The invention claimed is:

1. A method of measuring of flow rate using a measured element rotating in response to flow and a handheld electronic device, the handheld electronic device comprising at least one of a smart phone, tablet or laptop and including a processor, the method comprising:
   identifying one or more properties associated with the measured element using the handheld electronic device;
   measuring rotational speed of the measured element using the handheld electronic device, including recording a plurality of sequential images or a video of the measured element as it rotates using a camera of the handheld electronic device; and
   calculating a flow rate using the one or more properties associated with the measured element and the rotational speed of the measured element using the processor of the handheld electronic device.

2. The method of claim 1, wherein the step of calculating a flow rate includes analyzing the recording of the images or video to determine the rotational speed of the measured element.

3. The method of claim 1, further comprising the step of reducing the rotational speed of the measured element prior to the step of measuring the rotational speed of the measured element.

4. The method of claim 1, wherein the one or more properties include location of the measured element within a flow network, type of measured element, specific one of a measured element, predicted flow rate, prior measured flow rate, and/or past measured flow rate.

5. The method of claim 1, further comprising the step of saving data corresponding to the flow rate in a memory of the handheld electronic device.

6. The method of claim 1, further comprising the step of comparing the flow rate to another flow rate stored in a memory of the handheld electronic device and outputting an indicator onto a display of the handheld electronic device corresponding to the degree of any difference.

7. The method of claim 1, further comprising the step of coupling the measured element to a turbine in a fluid flow path such that rotation of the turbine in response to the flow rate of fluid through the flow path causes rotation of the measured element.

8. The method of claim 1, further comprising selecting the measured element from one of a plurality of measured elements and repeating the method for a plurality of the measured elements.

9. A method of measuring of flow rate using a measured element rotating in response to flow and a handheld electronic device, the handheld electronic device comprising at least one of a smart phone, tablet or laptop and including a processor, the method comprising:
   identifying one or more properties associated with the measured element using the handheld electronic device;
   measuring rotational speed of the measured element using the handheld electronic device; and
   calculating a flow rate using the one or more properties associated with the measured element and the rotational speed of the measured element using the processor of the handheld electronic device;
   wherein the step of measuring the rotational speed of the measured element includes the step of sequentially illuminating the measured element using a light of the handheld electronic device emitted at a variety of frequencies until a predetermined condition is met at one of the frequencies.

10. The method of claim 9, wherein the one of the frequencies is used in the step of calculating the flow rate.

11. The method of claim 9, wherein the predetermined condition is a stroboscopic effect.

12. The method of claim 9, further comprising the step of using an input of the handheld electronic device for indicating to the processor that the predetermined condition has been met so the processor can utilize the one of the frequencies in calculating flow rate.

13. A system for measuring of flow rate of different flow meters, the system comprising:
   a plurality of flow meters each having a measured element rotating in response to flow; and
   a handheld electronic device comprising at least one of a smart phone, tablet or laptop, the device having an input for use by a user to identify one or more properties associated with the measured element of one of the different flow meters, a memory and a camera for recording a plurality of sequential images or a video of the measured element as it rotates, and a processor for accessing the memory and analyzing the recording of the images or video to calculate the rotational speed of the measured element, and calculating a flow rate using the one or more properties associated with the measured element and the rotational speed of the measured element.

14. The system of claim 13, further comprising a turbine in a fluid flow path coupled to the measured element such that rotation of the turbine in response to the flow rate of fluid through the flow path causes rotation of the measured element.

15. A system for measuring of flow rate of different flow meters, the system comprising:
   a plurality of flow meters each having a measured element rotating in response to flow; and
   a handheld electronic device comprising at least one of a smart phone, tablet or laptop, the device having an input for use by a user to identify one or more properties associated with the measured element of one of the different flow meters, wherein the handheld electronic device includes a light that is illuminated at a variety of frequencies such that, in use, the light illuminates the measured element at the variety of frequencies until a predetermined condition is met at one of the frequencies.

16. The system of claim 15, wherein the predetermined condition is a stroboscopic effect.

17. The system of claim 16, wherein the handheld electronic device includes an input for indicating to the processor that the predetermined condition has been met so the processor can utilize the one of the frequencies in calculating flow rate.

18. The system of claim 15, further comprising a memory to which the calculated flow rate can be stored and accessed by the processor, the memory including another calculated flow rate accessible by the processor for comparison.

* * * * *